May 5, 1925.  1,536,865
F. J. KAHRER
MIXING VALVE
Filed June 14, 1924  2 Sheets-Sheet 1
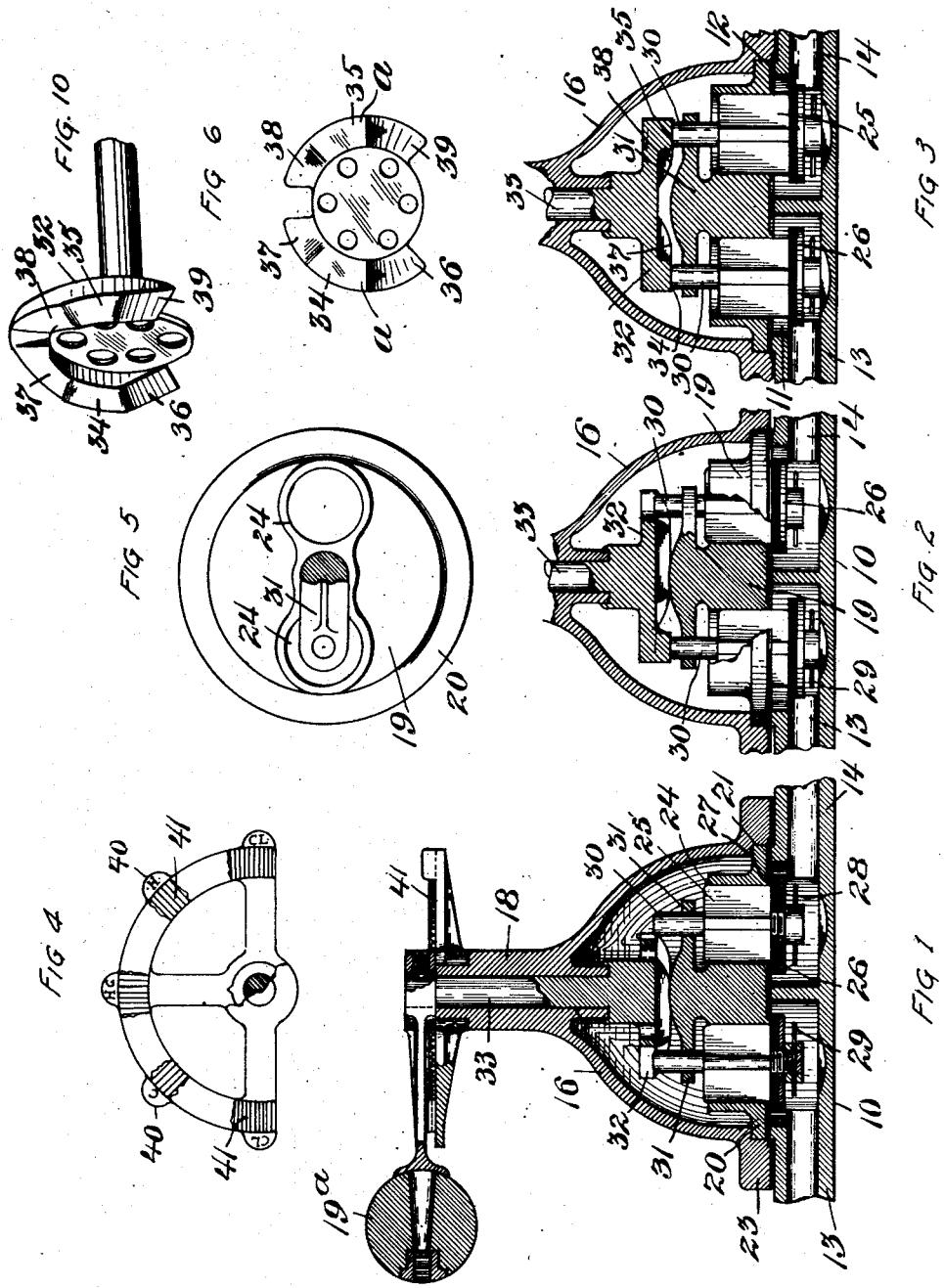

May 5, 1925.
F. J. KAHRER
MIXING VALVE
Filed June 14, 1924
1,536,865
2 Sheets-Sheet 2
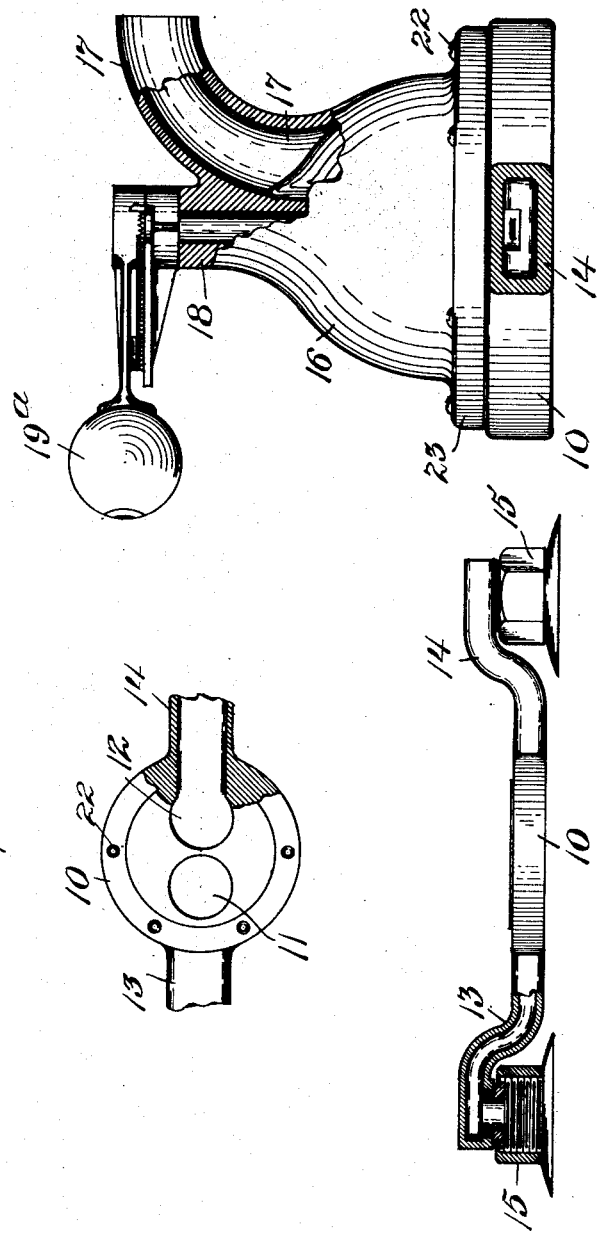

Patented May 5, 1925.

1,536,865

UNITED STATES PATENT OFFICE.

FERDINAND J. KAHRER, OF NEWARK, NEW JERSEY.

MIXING VALVE.

Application filed June 14, 1924. Serial No. 719,965.

*To all whom it may concern:*

Be it known that I, FERDINAND J. KAHRER, a citizen of the United States, and a resident of Newark, county of Essex, and State of New Jersey, have invented certain new and useful Improvements in Mixing Valves, of which the following is a specification.

This invention relates to an improved mixing valve of the type usually employed for regulating the temperature of the water emerging from the valve or faucet being controlled by a single handle to quickly change the respective amount of hot and cold water admitted to the valve and also provides for a fine adjustment of such quantities.

Valves of this type have been in use but the improvements in this particular valve provide for economy in manufacture, ease of assembly, the valve is compact and the operation thereof is easy.

The invention is illustrated in the accompanying drawings in which Figures 1, 2 and 3 are vertical sections through the valve with the control valves in different relative positions. Figure 4 is a top view of the handle securing and indicating plate. Figure 5 is a top view of the valve plate. Figure 6 is a face view of the cam for operating the valves. Figure 7 is a side view partly in section of the base or bottom plate, Figure 8 is a side view of the valve with an inlet pipe and the top part of the dome-like mixing chamber in section. Figure 9 is a detail of the centre part of the base plate and Figure 10 is a perspective view of the operating cam.

The valve comprising a base plate or bottom plate 10 with the two inlet ports 11 and 12 supplied by the inlet pipe 13 and 14 which are preferably flattened to provide a better appearance and secured to the cold and hot water pipes by the unions 15.

On the base plate is fastened the casing 16 which is preferably dome-like and encloses the mixing chamber and has a suitable spout 17. The spout can be constructed as a connection to a shower if desired. The mixing chamber also has on it a bearing 18 which acts as a support for the stem of the cam to be described hereinafter.

The valve plate 19 has its marginal edge 20 adapted to be seated in the recess 21 of the mixing chamber and is thus clamped between the mixing chamber and the bottom plate by suitable means such as the screws 22 which are screwed down through the flange 23 of the mixing chamber and into the base plate 10.

The valve plate is provided with two openings, 24 which are in register with the inlet ports 11 and 12. In each of these openings is arranged a valve 25 having wings to prevent side movement, these valves having a loose sliding fit in their respective openings. The part 26 of each valve is adapted to be seated on a valve seat 27 a suitable washer 28 being usually employed to insure against leakage. The discs 26 are held on the end of the stem in a manner to permit ready removal for replacement of washers and I show for this purpose a cotter pin 29.

These valves are held shut by pressure and are opened against the pressure. Each valve has a stem 30 and to co-operate with the wings 25, I arrange a bracket 31 which is preferably integral with the valve plate and extends over the openings as will be seen from Figure 5.

The valves are operated toward an open position by the cam 32 on the end of the stem 33 which extends through the bearing 18. The stem has a suitable handle 19ª. The cam has two supporting faces 34 and 35 the face 34 being flanked by the lifting faces 36 and 37 and the face 35 is flanked by the lifting faces 38 and 39. All these faces except the lifting faces 36 and 39 are on one side of the centre of the cam as will be seen from Figures 6 and 10. This disposition is desirable as the two supporting faces 34 and 35 are both supporting their respective valves in open position at practically one point in the rotative path and hence a slight movement either way from A in Figure 6, (assuming this to be the all-open position) will relieve either one or the other of the valve stems and vary the proportion. In other words, one of the valves is slowly closed while the other remains open and one valve always remains at rest while the other is moving. This arrangement also allows for a complete operation of the valve from closed to cold to warm to hot to closed again in a half turn of the handle, that is, a turn of 180 degrees.

To indicate the position of the valve the scale 40 is shown and it may be serrated as at 41 to hold the handle in its adjusted positions.

I claim:

1. A mixing valve comprising a flat base member, a dome like mixing chamber, a valve plate secured between them, valves in the plate and loosely fitting therein and acting to seat on the lower face thereof the valve plate including a bracket to act as bearings for the valve stems, and a cam mounted in the dome like chamber and having faces to engage the ends of the stems.

2. A mixing valve comprising a flat base member, a dome like mixing chamber, a valve plate secured between them, valves in the plate and loosely fitting therein and acting to seat on the lower face thereof the valve plate including a bracket to act as bearings for the valve stems, and a cam mounted in the dome like chamber and having supporting faces and lifting faces on each side of each supporting face, the supporting faces and one of each of said lifting faces being arranged to one side of the centre of the cam.

3. A valve comprising a casing, valves in the casing and opening against the pressure, and a manually operable cam to engage the valves to open them, the valves being in line and the cam having two supporting faces and two lifting faces for each supporting face, all said faces except two lifting faces being arranged at one side of the centre of the cam.

In testimony that I claim the foregoing, I have hereto set my hand, this 31st day of August, 1923.

FERDINAND J. KAHRER.